United States Patent
Kuzmack et al.

(10) Patent No.: US 9,229,705 B2
(45) Date of Patent: *Jan. 5, 2016

(54) IN-BAND HYPERVISOR-MANAGED FIRMWARE UPDATES

(71) Applicant: Dell Products L.P., Round Rock, TX (US)

(72) Inventors: Eric Kuzmack, Georgetown, TX (US); Raajeev Kalyanaraman, Round Rock, TX (US); Xianghong Qian, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,878

(22) Filed: Sep. 30, 2014

(65) Prior Publication Data

US 2015/0020062 A1  Jan. 15, 2015

Related U.S. Application Data

(63) Continuation of application No. 13/347,809, filed on Jan. 11, 2012, now Pat. No. 8,875,124.

(51) Int. Cl.
*G06F 9/44* (2006.01)
*G06F 9/445* (2006.01)
*G06F 9/455* (2006.01)
*H04L 29/08* (2006.01)

(52) U.S. Cl.
CPC  *G06F 8/65* (2013.01); *G06F 8/665* (2013.01); *G06F 9/45533* (2013.01); *G06F 9/45558* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 6,834,340 B2 | 12/2004 | Lee et al. | |
| 7,415,707 B2* | 8/2008 | Taguchi | G06F 8/61 717/174 |
| 8,127,292 B1* | 2/2012 | Dobrovolskiy | G06F 9/45541 717/174 |
| 8,201,161 B2* | 6/2012 | Challener | G06F 9/4411 717/168 |
| 2008/0244553 A1* | 10/2008 | Cromer | G06F 21/572 717/168 |
| 2009/0307713 A1 | 12/2009 | Anderson et al. | |

* cited by examiner

*Primary Examiner* — Don Wong
*Assistant Examiner* — Deric Ortiz
(74) *Attorney, Agent, or Firm* — Terrile, Cannatti, Chambers & Holland, LLP; Robert W. Holland

(57) ABSTRACT

A software update manager running on an information handling system over a type 1 hypervisor operating system retrieves a virtual firmware update through a primary network interface. The virtual firmware update executes over the hypervisor to initiate a download of a firmware update to a management processor of the information handling system through a management network interface. The firmware update executes to update the firmware of the information handling system with an update process managed by an end user through the primary network interface and the software update manager.

20 Claims, 2 Drawing Sheets

IN-BAND HYPERVISOR-MANAGED FIRMWARE UPDATES

BACKGROUND OF THE INVENTION

1. Field of the Invention

The present invention relates in general to the field of information handling firmware maintenance, and more particularly to in-band hypervisor-managed firmware updates.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In order to more effectively manage information handling system resources, some enterprises have turned to virtual machines. Virtual machines use hardware virtualization techniques to support multiple operating system guests running on a common host hardware platform. A virtual machine manager, also known as a hypervisor, presents guest operating systems with a virtual operating platform to manage the execution of the guest operating systems. The hypervisor is essentially a type of operating system that coordinates physical processing resources to support operation of virtual machines in a secure manner. A type 1 hypervisor runs directly on the host platform hardware to control the hardware and manage the guest operating systems, which run as a second level over the hypervisor. Some examples of commercially-available type 1 hypervisors are the VMware ESX and ESXi hypervisors. A type 2 hypervisor runs at a second level within another operating system so that guest virtual machine operating systems run over the hypervisor at a third level. Dividing physical processing resources into multiple virtual machines provides efficient use of resources while introducing only minimal overhead to processing operations. Each guest operating system runs as a separate kernel on the host physical processing resources to provide secure separation of virtual machines from each other.

One difficulty with virtualization using a type 1 hypervisor is that the security measures of the hypervisor that separate virtual machines from each other tend to limit maintenance operations performed by in-band communications through the hypervisor to the physical processing resources. Hypervisor-based update tools, such as VMware Update Manager, allow updates to virtual machine software, such as patch maintenance to operating systems; however, security considerations limit access by tools running over the hypervisor to the hardware and firmware of the underlying physical host system. In some instances, installed firmware versions are not visible via hypervisor application programming interfaces, so hypervisor update tools are not able to determine what firmware is installed versus what is available, making it difficult to obtain reporting on systems that need updates. Instead, information technology professionals typically have to access the physical host system by shutting down the hypervisor or through an out-of-band network interface to perform firmware updates, such as re-flashing the BIOS or other firmware instructions. Physical access is performed with a keyboard that interfaces directly with the system or with a remote access keyboard supported by a chassis or server management processor, such as a baseboard management controller, a lifecycle controller and/or a chassis management controller. Remote access is supported via an out-of-band network interface used for system maintenance that is separate from normal in-band operations performed by the host. Performing firmware updates separate from software updates increases the complexity of system management and increases the risk that necessary updates will go undone for decreased system security.

SUMMARY OF THE INVENTION

Therefore a need has arisen for a system and method which supports in-band firmware updates at physical resources running virtual machines over a type 1 hypervisor.

In accordance with the present invention, a system and method are provided which substantially reduce the disadvantages and problems associated with previous methods and systems for updating firmware at a host information handling system that runs virtual machines over a hypervisor operating system. Virtual firmware updates downloaded in-band to an update manager execute over the hypervisor to initiate an out-of-band firmware update at a management processor of the host information handling system. An end user manages firmware updates with an in-band update manager that transparently initiates out-of-band firmware update maintenance.

More specifically, a host information handling system runs a type-1 hypervisor operating system on a processor to support execution of plural virtual machines over the hypervisor. An update manager runs over the hypervisor to maintain software by reference to a software inventory. On boot of the information handling system, a firmware update manager performs an inventory of firmware and populates the software inventory with the firmware inventory. After boot, the update manager compares the software inventory, including the firmware inventory, with a software update resource repository to identify software and firmware due for an update to an updated version from an out-of-date version. If a firmware update is due, the update manager retrieves a virtual firmware update from the software update resource through an in-band network interface. The virtual firmware update executes over the hypervisor to initiate an out-of-band firmware update at a management processor of the information handling system. The virtual firmware update sends a message to a firmware update resource, which responds by sending an associated firmware update to the management processor. A firmware update manager stages the firmware update for execution and sends a firmware update complete message through the firmware update resource to the virtual firmware update. The update manager responds to the firmware update complete message by initiating a reboot of the information handling system so that the firmware update module can update the firmware during the reboot and update the firmware inventory. An end user can manually interact with the update manager to simultaneously perform software and firmware updates over a type 1 hypervisor that otherwise allows limited or no direct interaction with physical processing resources of the information handling system.

The present invention provides a number of important technical advantages. One example of an important technical advantage is that firmware updates for physical processing resources that support a type 1 hypervisor are scheduled and installed with an in-band update manager along with software updates for software running over the hypervisor. Reporting of firmware versions is supported through the in-band update manager to keep track of out-of-date firmware versions in a manner similar to reporting and tracking software versions. By providing firmware updates in-band along with software updates, end users have a common and familiar update manager so that maintenance is simplified and user-friendly for both software and firmware updates. In band firmware updates are made available without modifications at the hardware resources of the underlying system, such as the addition of hardware API's accessible by an update manager running over the hypervisor, and without impacting security of the virtual machines running over the hypervisor.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system physical processing resources have firmware updates initiated in-band over a type 1 hypervisor by executing a virtual firmware update retrieved with in-band tools to initiate out-of-band firmware updates. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
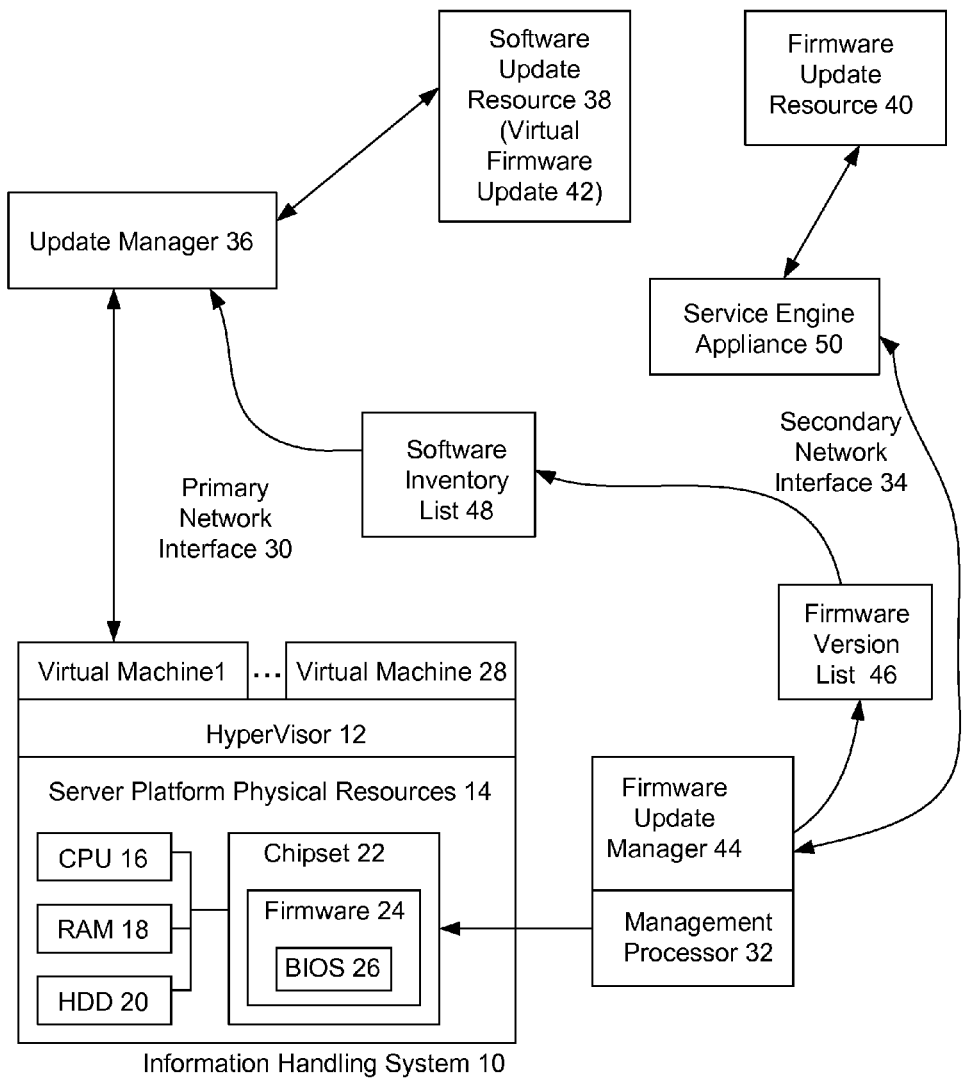
FIG. 1 depicts a block diagram of a system for supporting virtual firmware updates at an information handling system managed by a type 1 hypervisor.

Referring now to FIG. 1, a block diagram depicts a system for supporting virtual firmware updates at an information handling system 10 managed by a type 1 hypervisor 12. Information handling system 10 has server platform physical resources 14 that perform processing of information, such as one or more processors 16 that execute instructions, random access memory (RAM) 18 that stores information for processing, a hard disk drive (HDD) 20 that stores applications in non-volatile memory and a chipset 22 that includes firmware 24 to coordinate interactions between physical processing resources. One example of firmware 24 is a basic input/output system (BIOS) 26 that boots hypervisor 12 from an off state in storage of hard disk drive 20 to an on state in RAM 18 for execution by processor 16. In an operational state, hypervisor 12 executes over server platform physical resources 14 to support secure operations of one or more virtual machines 28 which communicate through a primary network interface 30, typically referred to as in-band communication. A management processor 32, such as a chassis management controller, baseboard management controller or lifecycle controller, provides management services to server platform physical resources 14 through a secondary network interface 34, typically referred to as out-of-band communication.

In operation, hypervisor 12 supports secure operation of virtual machines 28 with a type 1 configuration that limits access through primary network interface 30 to server platform physical resources 14. Management of software resource versions and updates for software that runs over hypervisor 12, such as virtual machines 28, is performed by an update manager 36 that runs over hypervisor 12 or interfaces with hypervisor 12 through primary network interface 30. A software update resource 38 provides update manager 36 with updates that run over hypervisor 12 to install updated software, such as operating system patches for operating systems of virtual machines 28. For example, an end user with authorization for management access to one or more virtual machines interacts with update manager 36 to maintain the virtual machines with updates available through software update resources 38. An example of a commercially available update manager is the VMware Update Manager application. However, since update manager 36 has limited access to hardware resources at server platform physical resources 14, updates to firmware 24 is performed through management processor 32 with secondary network interface 34. For example, firmware update resources 40 load updates through out-of-band network communications of secondary network interface 34 for execution by management processor 32, such as a re-flash of BIOS 26. Note that the primary and secondary network interfaces may have physically separate network connections or separate logical network connections through a common physical connection.

To enable management of firmware resources using in-band communications of primary network interface 30, a virtual firmware update 42 is stored in software update resources 38 for implementation by update manager 36. In essence, virtual firmware update 42 spoofs hypervisor 12 to present firmware updates as an in-band management function of update manager 36 while performing firmware updates through out-of-band communications of secondary network interface 34 and management processor 32. Virtual firmware update 42 is, in one example embodiment, a script that executes through update manager 36 in a manner similar to software updates, however, virtual firmware update 42 includes instructions that call for a firmware update through primary network interface 30 to firmware update resource 40 that is performed by a firmware update manager 44 through secondary network interface 34. Initiation of virtual firmware update 42 through update manager 36 allows end users to perform the firmware update in a manner transparently the same as software updates while the actual firmware updates are automatically and invisibly supported out-of-band with management processor 32.

Firmware update manger 44 is, for example, a module running on management processor 32 or several modules distributed to run over management processor 32 and/or appliances associated with firmware update resource 40. In one alternative embodiment, firmware update manager 44 may run as a module over the hypervisor of a managed system. Upon initial power up and boot of information handling system 10, firmware update manager 44 generates a firmware version list 46 that identifies the versions of firmware for hardware devices of server platform physical resources 14. Firmware update manager 44 then populates a software inventory list 48 that is accessible by update manager 36 with the firmware version list 46. For example, software inventory list 48 includes versions of hypervisor software modules, device drivers and supporting software managed by the hypervisor. After boot is complete and update manager 36 is running over hypervisor 12, update manager 44 retrieves firmware version list 46 from software inventory list 48 and applies the firmware versions to identify associated virtual firmware updates stored on software update resource 38. If a virtual firmware update 42 exists for a firmware version from firmware version list 46, then the virtual firmware update 42 is executed over hypervisor 12 to initiate an update of the firmware version. The virtual firmware update 42 is, for example, a script that executes to call a service engine appliance 50 associated with firmware update resources 40. Service engine appliance 50 is essentially a distributed portion of firmware update manager 44. Service engine appliance 50 downloads a firmware update payload associated with the firmware version of virtual firmware update 42 from firmware update resource 40 to firmware update manager 44, which stages the firmware update for execution by management processor 32. Service engine appliance 50 then reports back to virtual firmware update 42 that the firmware update is staged so that update manager 36 can initiate a restart of information handling system 10 to install the firmware update. In one embodiment, communications between virtual firmware update 42 running over hypervisor 12 and service engine appliance 50 are performed in-band while communications between service engine appliance 50 and firmware update manager 44 are performed out of band.

Figure 2:
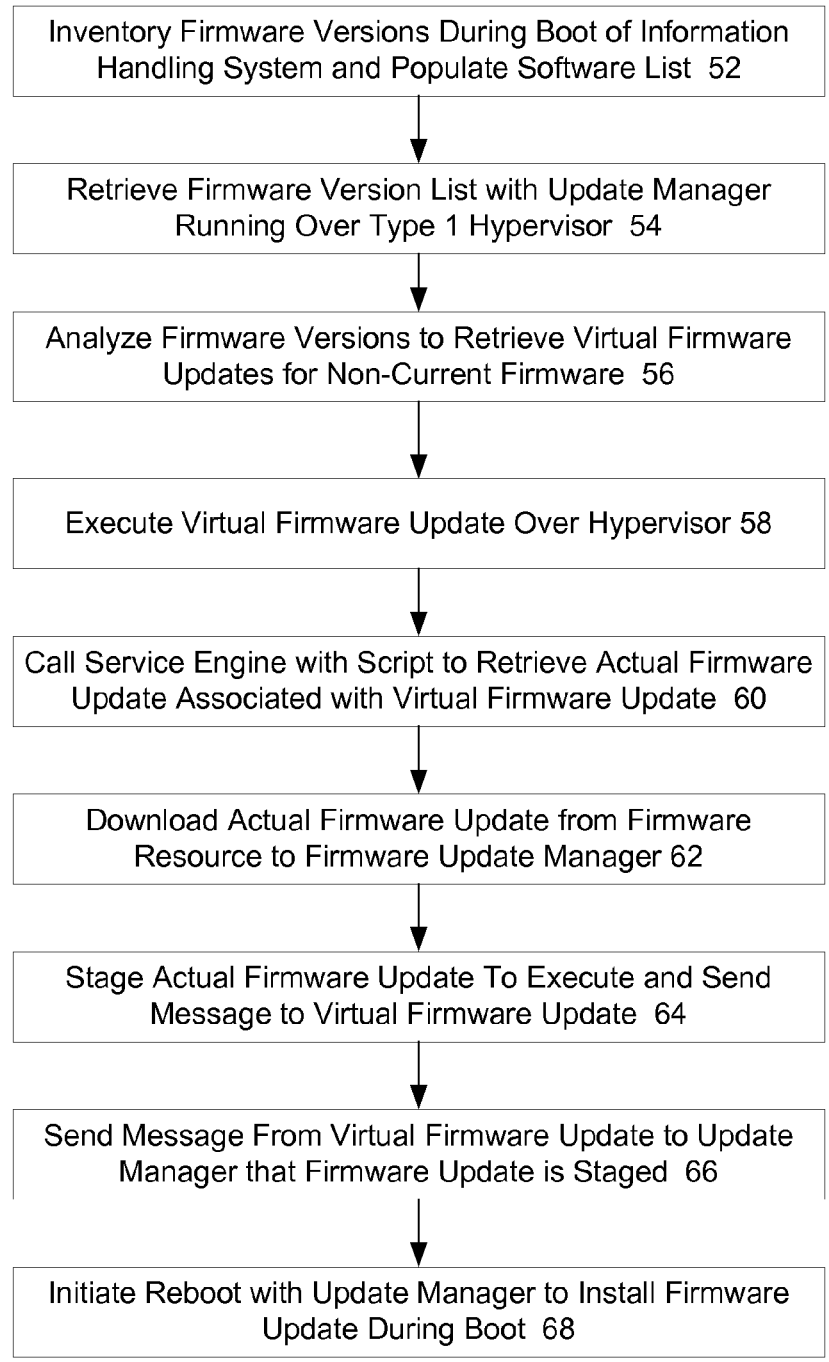
FIG. 2 depicts a flow diagram of a process for performing an out-of-band firmware update with an in-band software update manager.

Referring now to FIG. 2, a flow diagram depicts a process for performing an out-of-band firmware update with an in-band software update manager. The process begins at step 52 with a boot of the information handling system physical resources having firmware under management. During boot, a list of installed firmware versions is compiled and inserted in an inventory of software under management at the information handling system. At step 54, after completing boot and passing system control to a type 1 hypervisor, the update manager running over the hypervisor retrieves the firmware version list from the software inventory. Retrieving the firmware version list is performed at step 56 with the same management interface used to manage software of the information handling system. The update manager compares the firmware versions with the current versions and retrieves virtual firmware updates for any firmware versions that are not current. The comparison of versions with current versions and retrieval of the virtual firmware update for non-current firmware is managed along with software version management. Once a virtual firmware update is retrieved from software update resources, the update manager running over the hypervisor executes the virtual firmware update over the hypervisor at step 58.

Upon execution, a script of the virtual firmware update runs at step 60 to call to a firmware update manager for initiating installation of the actual firmware update associated with the virtual firmware update. Management steps taken by the update manager running over the hypervisor are communicated in-band through the primary network interface. The script calls to the firmware manager to bridge the firmware update process between the primary and secondary network interfaces. For example, the virtual firmware script at step 60 calls a service engine appliance through the primary network interface so that the service engine appliance can upload the firmware update through the secondary network interface. At step 62, the service engine appliance responds to the call from the virtual firmware update by downloading the actual firmware update from a firmware update resource to a firmware update manager through the secondary network interface. At step 64, the firmware update manager stages the actual firmware update for execution by a management processor of the information handling system and reports that the firmware update is prepared to execute back through the service engine appliance to the virtual firmware update script. At step 66, the virtual firmware update reports that the firmware update is staged to the update manager and, at step 68, the update manager initiates a restart of the information handling system so the actual firmware update can execute during boot.

Although the present invention has been described in detail, it should be understood that various changes, substitutions and alterations can be made hereto without departing from the spirit and scope of the invention as defined by the appended claims.

What is claimed is:

1. A method for updating firmware of an information handling system running an operating system, the method comprising:

populating an inventory identifying the firmware, the inventory accessible by applications running over the operating system;

analyzing the inventory with an update manager running over the operating system to determine that at least some of the firmware needs an update;

obtaining a first update with the update manager through a primary network interface; and executing the first update over the operating system, the first update instructing a management processor of the information handling system to update the firmware with a firmware update downloaded through a secondary network interface.

2. The method of claim 1 wherein the first update instructs the management processor to update the firmware with a message sent through the primary network interface to the secondary network interface.

3. The method of claim 2 wherein the management processor responds to the first update by retrieving the firmware update through the secondary network interface and staging the firmware update to execute at a next boot of the information handling system.

4. The method of claim 3 wherein the management processor provides a firmware update complete message to the update manager upon staging the firmware update to execute.

5. The method of claim 3 wherein the management processor provides a firmware update complete message to the update manager upon execution of the firmware update at the next boot of the information handling system.

6. The method of claim 3 wherein the management processor automatically initiates a boot of the information handling system upon staging the firmware update to execute at the next boot of the information handling system.

7. The method of claim 1 wherein the operating system comprises a type 1 hypervisor.

8. The method of claim 1 wherein the operating system comprises a hypervisor and the inventory comprises an inventory of virtual machines operable to run over a hypervisor.

9. The method of claim 8 wherein the firmware update comprises a BIOS update.

10. An information handling system comprising:
a processor operable to execute instructions;
memory interfaced with the processor;
an operating system stored in the memory and operable to execute on the processor;
firmware interfaced with the processor and operable to boot the operating system;
a management processor interfaced with the firmware; and
a firmware update manager operable to execute on the management processor to update the firmware; and
an update manager operable to execute over the operating system to update software stored in the memory, the update manager retrieve a firmware update indication through a primary network interface, the firmware update indication causing an instruction to be sent through the primary network interface to the firmware update manager to load a firmware update from a secondary network interface of the management processor.

11. The information handling system of claim 10 further comprising:
a software inventory stored in the memory; and
a firmware inventory stored in the memory at boot of the operating system by the firmware update manager;
wherein the update manager applies the firmware inventory to determine that a firmware update indication exists to update the firmware.

12. The information handling system of claim 11 wherein the operating system comprises a type 1 hypervisor.

13. The information handling system of claim 12 wherein the software inventory comprises versions of hypervisor software modules, device drivers and supporting software.

14. The information handling system of claim 13 wherein the firmware update indication includes instructions to load the firmware update for execution by the management processor through the secondary network interface of the management processor.

15. The information handling system of claim 14 wherein the firmware update manager is further operable to stage the firmware update for execution and to communicate an update complete message through the secondary network interface to the primary network interface for the update manager.

16. A system for updating firmware of an information handling system, the system comprising:
a software update resource operable to send software updates to the information handling system through a primary network interface;
a firmware update resource operable to send firmware updates to a management processor of the information handling system through a secondary network interface; and
a firmware update indication included with the software update resource for communication to the information handling system through the primary network interface, the firmware update indication causing initiation of a download of a firmware update from the firmware update resource to the management processer through the secondary network interface.

17. The system of claim 16 wherein the firmware update indication includes instructions that execute over a type 1 hypervisor.

18. The system of claim 17 further comprising a firmware update manager executing on the management processor and operable to store an inventory of firmware at memory of the information handling system accessible by the type 1 hypervisor.

19. The system of claim 18 further comprising a software update manager running over the type 1 hypervisor and operable to access the inventory of firmware to determine a firmware update indication and to request a firmware update from the software update resource, the firmware update indication associated with the determined firmware update.

20. The system of claim 19 wherein the software update manager is further operable to access an inventory of virtual machines and to request updates for the virtual machines from the software update resource.

* * * * *